Figure 1:
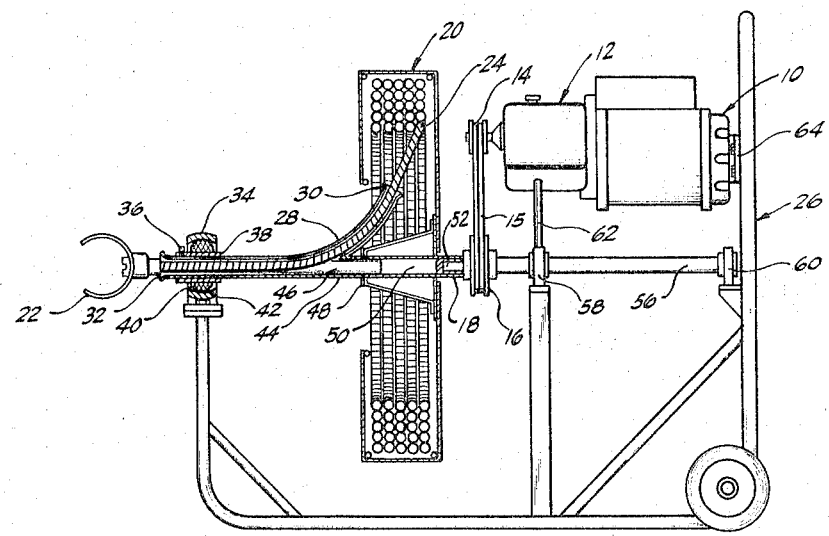

Jan. 17, 1967  T. L. RATLIFF  3,298,051

CONDUIT CLEANING APPARATUS

Filed Oct. 24, 1965

INVENTOR.
TROY L. RATLIFF
BY Bruce A Jogger

ATTORNEY 3,298,051
CONDUIT CLEANING APPARATUS
Troy L. Ratliff, 4502 W. Sunswept,
Santa Ana, Calif. 92703
Filed Oct. 24, 1965, Ser. No. 504,741
6 Claims. (Cl. 15—104.3)

This invention relates to a conduit cleaning apparatus. More particularly, this invention relates to a rotary sewer pipe cleaning apparatus.

The apparatus of this invention cleans conduit by rotating a cutting head which is attached to the end of a cable. The rotating cutting head is moved through the conduit which it is desired to clean. The cable to which the cutting head is attached may be considered to be a flexible drive shaft. The cable extends back to the apparatus of this invention and transmits rotational power from the apparatus of this invention to the cutting head disposed within the conduit.

Previously, considerable difficulty had been experienced in cleaning long lengths of sewer pipe because of the problems encountered when driving long lengths of cable into the sewer pipe.

According to this invention, the apparatus of this invention permits long lengths of cable, for example, six hundred feet, to be driven into a sewer pipe by a lightweight, maneuverable, substantially trouble-free machine.

The cable, which serves as a flexible drive shaft, is stored in reels containing a maximum of about one hundred fifty feet of cable. In order to drive a six hundred foot length of cable, it is necessary to use four reels full of cable. This necessitates changing reels during the operation of cleaning the obstructed sewer. Advantageously, this invention provides for the convenient, rapid changing of reels so as to materially shorten the time required to clean an obstructed sewer.

Broadly, the apparatus of this invention comprises: a supporting frame; a swivel bearing mounted on one end of the supporting frame; a drive shaft mounted on the supporting frame, spaced apart from and in axial alignment with the swivel bearing; a means for driving the drive shaft; a guide tube for the cable mounted for three dimensional movement in the swivel bearing; and a cable-carrying reel, releasably and rotatably mounted between the guide tube and the drive shaft.

Advantageously, the means for driving the drive shaft is an electric motor, which is geared down by a gear box to a revolutionary speed which is approximately that desired for the cutting head. Preferably, the motor and gear box are mounted above the drive shaft so as to keep them out of the mud and water which often surround the base of this machine in operation. Advantageously, the gear box and the drive shaft are connected by a belt extending from a small pulley on the gear box to a small pulley on the drive shaft. Using a gear box to reduce the speed of the motor to the desired revolutionary speed for the cutting head eliminates the necessity for the use of a large pulley on the drive shaft. When a small pulley is used on the drive shaft, which pulley does not have a diameter greatly in excess of that of the drive shaft, it keeps the belt up as far as possible out of the mud and water which often surround the base of this machine in operation.

Preferably, the reel is so mounted in the apparatus of this invention that the release of one locking means, such as a set screw, will permit the reel to be removed rapidly. In a preferred embodiment of this invention, the reel has a hub which extends longitudinally through the center of the reel. The hub is provided at one side with a driver socket which is adapted to absorb rotational energy from a driver stub. The stub and socket are designed to slip together. The other end of the hub is designed to receive a stub shaft which can rotate independently of the hub. The stub shaft and the hub also slip together. The stub shaft is mounted to a guide tube in axial alignment with the swivel bearing and drive shaft. The guide tube curves off from this stub shaft so that the entrance end of the guide tube is positioned to receive cable from the interior of the reel without subjecting the cable to any sharp bend as it enters the guide tube. The portion of the guide tube immediately adjacent to the exit end of the guide tube is straight and is in axial alignment with the drive shaft. The guide tube is restrained from longitudinal movement through the swivel bearing by a releasable connection, such as a set screw. When the releasable connection is released, the guide tube may be slipped forward so as to slip the driver socket in the reel hub off of the driver stub. In this position, the guide tube may be swiveled out of axial alignment with the driver shaft so that the reel may be slipped off the stub shaft without interference from the driver stub. This is a very rapid operation, which can be accomplished with ease by one man in a few seconds.

Figure 2:
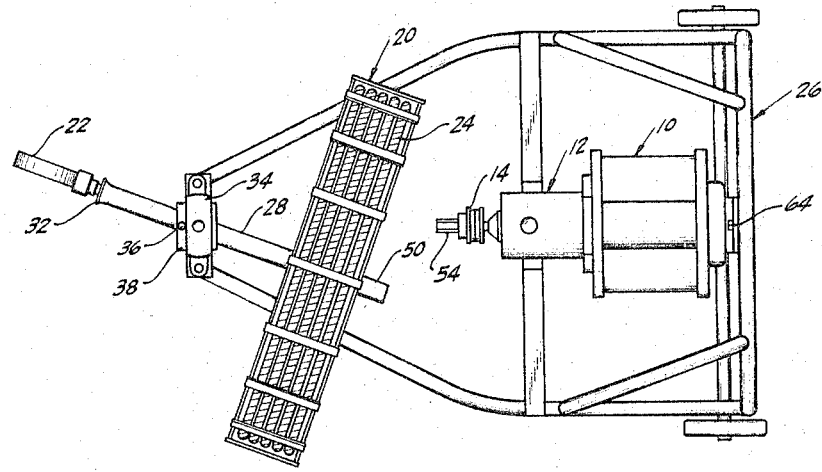

For a more complete understanding of the invention, reference is made to the accompanying drawings in which:

FIGURE 1 is a side elevation partially in section of the apparatus of this invention; and FIGURE 2 is a plan view of the apparatus of this invention in which the apparatus is partly disassembled.

Referring particularly to FIGURE 1, there is illustrated a motor 10 which is attached to and drives a gear box 12 which is attached to and drives a gear box pulley 14 which in turn through belt 15 drives driveshaft pulley 16. Slip coupling 18 transmits the torque from drive shaft pulley 16 to a reel indicated generally at 20 which in turn drives cutting head 22 which is affixed to the end of cable 24. Motor 10, gear box 12 and reel 20 are positioned in operative relationship to one another within a frame indicated generally at 26. A guide tube 28 having a guide tube mouth 30 and guide tube exit 32 carries cable 24 from reel 20 out of the machine. Guide tube 28 passes through swivel bearing 34. Set screw 36 passes through sleeve 38 and bears against the outer surface of guide tube 28 to prevent relative motion between guide tube 28 and sleeve 38. Sleeve 38 is affixed to convex bearing element 40 which is movably positioned in concave bearing element 42. Stub shaft housing 44 projects rearwardly from guide tube 28 in a direct line with sleeve 38. Stub shaft 46 is positioned inside stub shaft housing 44. Stub shaft housing 44 has flange 48 at the rearward end thereof. Stub shaft 46 projects beyond flange 48 and is adapted to slip into the interior of hub 50. At its rearward end hub 50 carries driver socket 52 which is adapted to receive driver stub 54 (see FIGURE 2). Drive shaft 56 is mounted in bearings 58 and 60, which bearings are mounted on frame 26. An adjustable mount 62 and an adjustable mounting plate 64 are attached to gear box 12 and motor 10 respectively to permit adjustment of the height of gear box pulley 14 with respect to drive shaft pulley 16 so as to regulate the tension on belt 15.

In operation, cable 24 is pulled out of reel 20 through guide tube 28 by hand. Cutting head 22 is positioned in the opening to a clogged or obstructed pipe or conduit and is forced into the obstructed conduit by feeding cable 24 into the conduit by hand. As cutting head 22 is forced into the obstructed conduit, motor 12 is activated so that reel 20 is rotated carrying cable 24 with it. The rotation of reel 20 causes cutting head 22 to rotate.

When a reel full of cable, which is generally about 150 feet, has been fed into a clogged conduit, motor 10 is turned off so that rotation of reel 20 discontinues. Set screw 36 is loosened and guide tube 28 is slipped forward through sleeve 38 until driver stub 54 is disconnected from driver socket 52. At this point, a reel 20 is swung out, as shown in FIGURE 2, the empty reel 20 may then be removed from stub shaft 46 and a new reel full of cable inserted in its place. The ends of the cable are joined together with a quick-release connection, not shown, reel 20 is swung back and driver socket 52 is engaged with driver stub 54. Set screw 36 is tightened so as to secure stub shaft 46 in hub 50 and driver stub 54 in driver socket 52. An additional 150 feet of cable length may then be driven into the clogged conduit. As many as four reels of cable may be driven into a clogged conduit in this manner simply by changing reels. As the cable is withdrawn from the clogged conduit, it is fed back into the reel which is positioned in the machine. As each reel is filled with cable, it is removed and an empty reel is inserted in its place.

Guide tube 28 and reel 20 are so mounted that they may be rotated independently of one another. Thus, while cable 24 is being withdrawn from reel 20, guide tube 28 rotates slightly faster than reel 20. When cable 24 is being fed back into reel 20, the converse takes place, that is, reel 20 rotates slightly faster than guide tube 28.

Motor 10 is mounted high on frame 26 so that it will be clear of any mud or water which may surround the bottom of frame 26.

The gear ratio in gear box 12 is such that gear box pulley 14 is turning at approximately the same r.p.m. as that desired for cutting head 22. Drive shaft pulley 16 is therefore approximately the same size as gear box pulley 14. Both pulleys 14 and 16 are preferably of relatively small diameter which keeps drive shaft pulley 16 and belt 15 as far as possible above any mud and water which may surround the base. Belt 15 is also removed slightly from reel 20 so that any mud and water which may be thrown from cable 24, particularly as it is being rewound into reel 20, will not spray out onto belt 15.

The positioning of belt 15 in the power train between cutting head 22 and gear box 12 cushions the gears against shocks due to cutting head 22 striking against obstructions. Preferably, some shock absorbing means such as belt 15 is provided between cutting head 22 and gear box 12.

Preferably, the gearing arrangement provided in gear box 12 runs quietly so that a residential neighborhood is not disturbed by noise from the operation of this apparatus.

The preferred embodiments of this invention described herein may be modified without departing from the spirit and scope of the claims.

What is claimed is:
1. A rotary pipe cleaner comprising:
a supporting frame;
a swivel bearing mounted on said frame;
a rotatable drive shaft mounted on said frame in axial alignment with said swivel bearing;
a means for driving said drive shaft in a rotational movement;
a guide tube mounted in said swivel bearing;
a releasable connection between said swivel bearing and said guide tube to restrain said guide tube from axial movement through said bearing;
a reel adapted for carrying cable releasably and rotatably mounted between said guide tube and said drive shaft, said guide tube and said reel being rotatable independently of one another; and
a rotationally rigid coupling between said drive shaft and said reel, whereby said rotational movement of said drive shaft is imparted to said reel.

2. A rotary pipe cleaner comprising:
a supporting frame;
a swivel bearing mounted on said frame;
a guide tube rotatably mounted in said swivel bearing, said guide tube being releasably restrained from longitudinal movement through said swivel bearing, said guide tube having a substantially straight portion positioned in said swivel bearing and an arcuate portion;
a stub shaft projecting from said arcuate portion in axial alignment with said straight portion;
a reel adapted for carrying cable, said reel containing a hub, said hub and said stub shaft being slidably connectable to one another, said reel and said guide tube being independently rotatable; and
means for driving said reel comprising a driver stub which is releasably connected to a driver socket in said hub, a first pulley having a diameter not substantially in excess of said driver stub, said first pulley being connected to said driver stub, a belt connecting said first pulley with a second pulley, said second pulley having substantially the same diameter as said first pulley, said second pulley being connected to a gear box which gear box is driven by a motor.

3. A rotary pipe cleaner comprising:
a supporting frame;
a swivel bearing mounted on said frame;
a guide tube rotatably mounted in said swivel bearing, said guide tube being releasably restrained from longitudinal movement through said swivel bearing, said guide tube having a substantially straight portion positioned in said swivel bearing and an arcuate portion;
a stub shaft projecting from said arcuate portion in axial alignment with said straight portion;
a reel adapted for carrying cable, said reel containing a hub, said hub and said stub shaft being slidably connectable to one another, said reel and said guide tube being independently rotatable; and
means for driving said reel comprising a drive shaft having a driver stub at the end thereof, said driver stub being slidably connectable to a socket in said hub, said drive shaft being mounted on said frame in axial alignment with said swivel bearing, a first pulley on said drive shaft connected by a belt to a second pulley, said first and second pulleys having substantially the same diameter, said diameter not being substantially in excess of the diameter of said drive shaft, said second pulley being connected through the gear box to a motor, said motor being mounted above said drive shaft.

4. A rotary pipe cleaner comprising:
a supporting frame;
a swivel bearing mounted on said frame;
a drive shaft mounted on said frame in axial alignment with said swivel bearing, said drive shaft being adapted to drive a driver stub;
means for driving said drive shaft;
a reel adapted for carrying cable;
a guide tube mounted in said swivel bearing, said guide tube having a substantially straight portion positioned in said swivel bearing and an arcuate portion;
a stub shaft porjected from said arcuate portion in axial alignment with said straight portion;
a hub in said reel, said hub being adapted to slidably receive said stub shaft;
a driver socket in said hub, said driver socket being adapted to slidably receive said driver stud, whereby said reel is rotatably supported between said stub shaft and said driver stub; and
a releasable means for securing said stub shaft and said driver stub in said hub.

5. The rotary pipe cleaner of claim 4 wherein said swivel bearing comprises a sleeve adapted to surround said guide tube and said means for securing said stub shaft and said driver stub in said hub is a set screw projecting through said sleeve and adapted to bear against said guide tube.

6. The rotary pipe cleaner of claim 4 wherein said swivel bearing comprises a sleeve adapted to surround said straight portion of said guide tube, and a convex bearing surface adapted to rotate and swivel against a stationary concave bearing surface.

References Cited by the Examiner
UNITED STATES PATENTS

| | | | |
|---|---|---|---|
| 2,102,610 | 12/1937 | Blashill | 242—54 |
| 3,095,592 | 7/1963 | Hunt | 15—104.3 |

CHARLES A. WILLMUTH, *Primary Examiner.*

E. L. ROBERTS, *Assistant Examiner.*